(12) United States Patent
Bartoli et al.

(10) Patent No.: US 9,949,590 B2
(45) Date of Patent: Apr. 24, 2018

(54) BEVERAGE DISPENSING MACHINE

(71) Applicant: SARONG SOCIETA' PER AZIONI, Reggiolo (Reggio Emilia) (IT)

(72) Inventors: Andrea Bartoli, Reggio Emilia (IT); Davide Capitini, Reggio Emilia (IT); Alessandro Grillenzoni, Campogalliano (IT)

(73) Assignee: SARONG SOCIETA' PER AZIONI, Reggiolo (Reggio) (IT)

( * ) Notice: Subject to any disclaimer, the term of this patent is extended or adjusted under 35 U.S.C. 154(b) by 65 days.

(21) Appl. No.: 15/029,225

(22) PCT Filed: Oct. 15, 2014

(86) PCT No.: PCT/IB2014/065330
§ 371 (c)(1),
(2) Date: Apr. 13, 2016

(87) PCT Pub. No.: WO2015/056188
PCT Pub. Date: Apr. 23, 2015

(65) Prior Publication Data
US 2016/0255990 A1 Sep. 8, 2016

(30) Foreign Application Priority Data

Oct. 17, 2013 (IT) .............................. MO2013A0295

(51) Int. Cl.
*A47J 31/40* (2006.01)
*A47J 31/36* (2006.01)
(Continued)

(52) U.S. Cl.
CPC ......... *A47J 31/407* (2013.01); *A47J 31/0668* (2013.01); *A47J 31/369* (2013.01);
(Continued)

(58) Field of Classification Search
CPC ................ A47J 31/3628; A47J 31/3633; A47J 31/3676; A47J 31/369
(Continued)

(56) References Cited

U.S. PATENT DOCUMENTS 6,240,832 B1 * 6/2001 Schmed ............. A47J 31/3623
221/121
6,499,388 B2 * 12/2002 Schmed ............. A47J 31/3623
99/295
(Continued)

FOREIGN PATENT DOCUMENTS

EP 1163869 A1 12/2001
IT MO20120326 A1 6/2014
(Continued)

OTHER PUBLICATIONS

International Search Report and Written Opinion of the International Searching Authority Application No. PCT/IB2014/065330 Completed: Feb. 16, 2015; dated Mar. 5, 2015 7 pages.
(Continued)

*Primary Examiner* — Reginald L Alexander
(74) *Attorney, Agent, or Firm* — Whitmyer IP Group LLC

(57) ABSTRACT

A beverage dispensing machine for producing a beverage from a capsule containing a product, includes an injecting arrangement arranged for piercing a covering element of the capsule and injecting into the latter a liquid interacting with the product to make a beverage, a housing element provided with a seat into which the capsule is insertable, a dispensing unit for dispensing said liquid into the capsule, said housing element rests on elastic elements and is slidable inside a chamber obtained in a box element that is insertable into a space of the dispensing unit, the chamber being provided with a fixed support intended for constituting a rest for a bottom of the capsule when the latter is inserted into the seat.

18 Claims, 19 Drawing Sheets

(51) Int. Cl.
*A47J 31/06* (2006.01)
*A47J 31/44* (2006.01)

(52) U.S. Cl.
CPC ....... *A47J 31/3628* (2013.01); *A47J 31/4492* (2013.01); *A47J 31/3633* (2013.01); *A47J 31/3676* (2013.01)

(58) Field of Classification Search
USPC .............................................. 99/289 R, 295
See application file for complete search history.

(56) References Cited

U.S. PATENT DOCUMENTS

| | | | |
|---|---|---|---|
| 7,856,920 B2* | 12/2010 | Schmed | A47J 31/0673 99/289 R |
| 2002/0148356 A1 | 10/2002 | Lazaris et al. | |
| 2011/0100228 A1* | 5/2011 | Rivera | A47J 31/446 99/281 |
| 2011/0271843 A1* | 11/2011 | Cheng | A47J 31/3633 99/295 |

FOREIGN PATENT DOCUMENTS

| | | | |
|---|---|---|---|
| WO | 2006016054 A1 | 2/2006 | |
| WO | 2010134054 A2 | 11/2010 | |
| WO | 2012104760 A1 | 8/2012 | |

OTHER PUBLICATIONS

European Office Action Application No. 14802159.5 Completed Date: Mar. 1, 2017 5 Pages.

\* cited by examiner

BEVERAGE DISPENSING MACHINE

CROSS-REFERENCE TO RELATED APPLICATIONS

This application is a national phase of PCT International Application No. PCT/IB2014/065330 filed Oct. 15, 2014. PCT/IB2014/065330 claims priority to IT Application No. MO2013A000295 filed Oct. 17, 2013. The entire contents of these applications are incorporated herein by reference.

TECHNICAL FIELD

The invention relates to a dispensing machine for producing beverages, in particular it refers to a dispensing machine for producing both a hot beverage, for example coffee, barley, herbal tea, tea, chocolate, etc and a cold beverage, for example a soft drink, by injecting a fluid, typically pressurised hot water or pressurised cold water inside a capsule containing a percolable or soluble or infusion or concentrated product.

BACKGROUND

From WO2012/104760, filed in the name of the applicant of this application, a dispensing machine is known for producing a final food product in the form of a beverage, from a compressible and crushable capsule, containing an initial product, comprising an injecting arrangement arranged for piercing a covering element of the cap and injecting into the latter a liquid interacting with said initial product to make a final food product in the form of a beverage.

The machine comprises a positioning arrangement that is arranged for housing said capsule and is movable along a direction between an initial operating position in which the capsule is insertable into the positioning arrangement, an intermediate operating position in which the capsule abuts on at least the injecting arrangement, which pierces the covering element to inject said liquid, and a final operating position in which the capsule has a reduced volume, having been progressively compressed and crushed by the positioning arrangement against said injecting arrangement so as to be opened and enable the end product to exit.

SUMMARY

An object of the present invention is to provide a dispensing machine for producing beverages that has greater versatility, i.e. enables a greater variety of beverages to be produced.

A further object of the present invention is to provide a dispensing machine that enables the quality of the beverages produced to be increased.

A still further object of the present invention is to provide a dispensing machine that enables both hot and cold beverages to be produced.

Another object of the present invention is to provide a dispensing machine in which, after dispensing a beverage, no residues remain in the machine that may contaminate a subsequently dispensed beverage.

The objects of the present invention are achieved with a dispensing machine for producing beverages according to the independent claim.

Owing to the invention it is possible to produce beverages both from a soluble product such as, for example, a lyophilised powder product and from a percolable product such as, for example, coffee powder, and from an infusion product, for example tea leaves, and from a concentrated product, which enables a wide variety of beverages, both hot and cold, to be obtained that are normally not obtainable with a single machine for producing beverages.

BRIEF DESCRIPTION OF THE DRAWINGS

Some ways of implementing the invention are disclosed below by way of non-limiting example, with reference to the attached drawings, in which.

DETAILED DESCRIPTION

Figure 1:
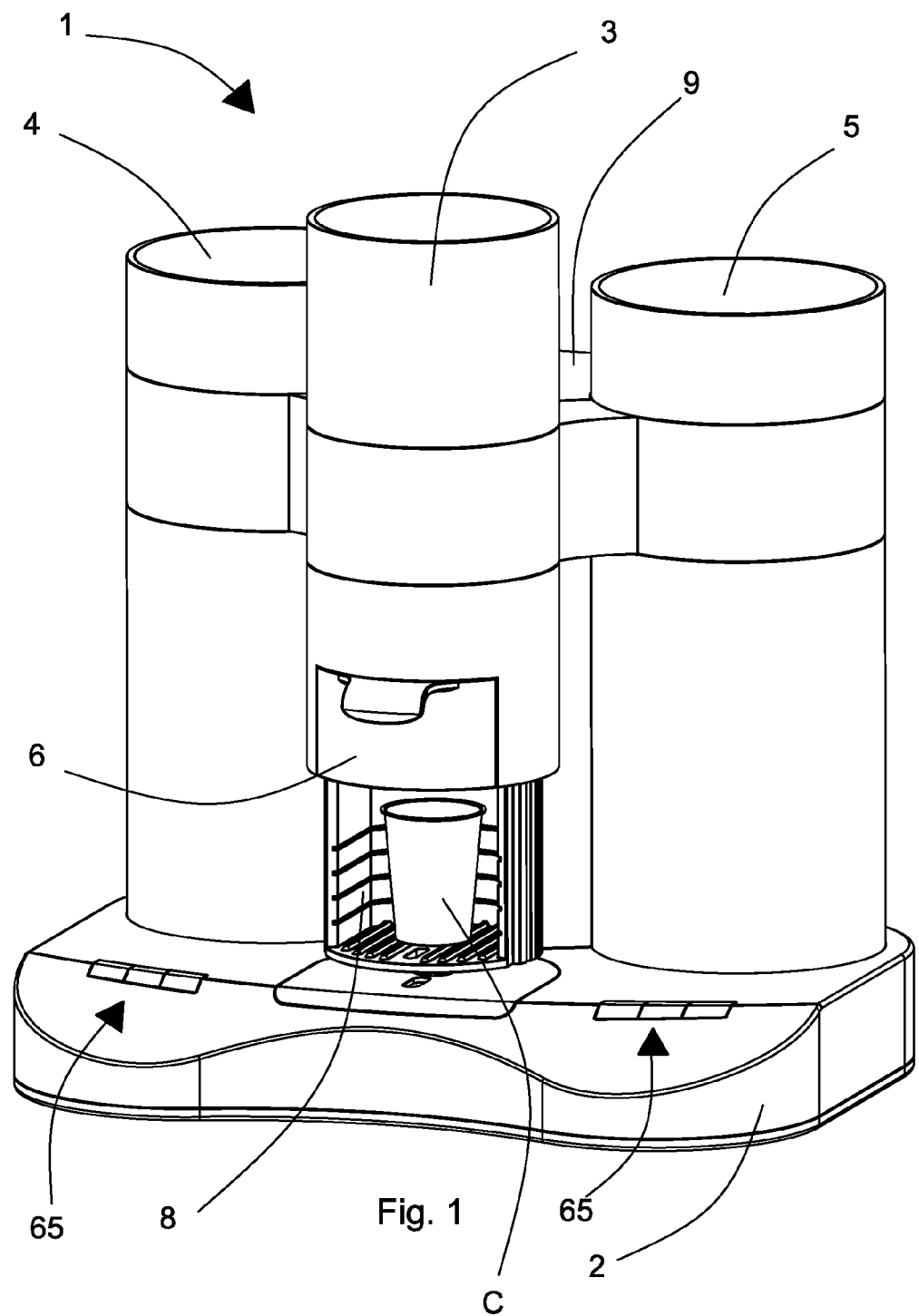
FIG. 1 is a perspective front view of a first embodiment of the machine according to the invention.
Figure 2:
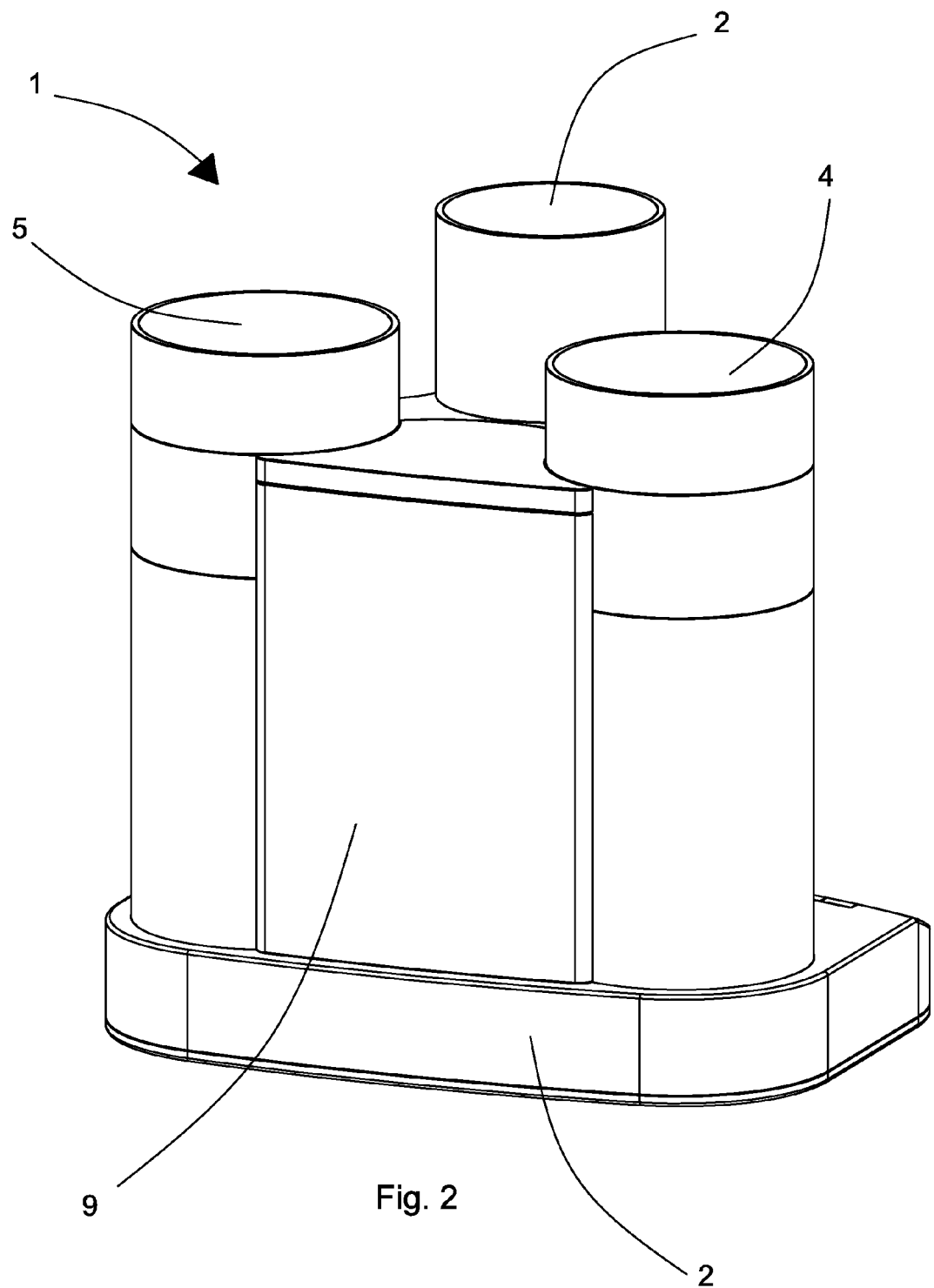
FIG. 2 is a perspective rear view of a machine in FIG. 1.
Figure 3:
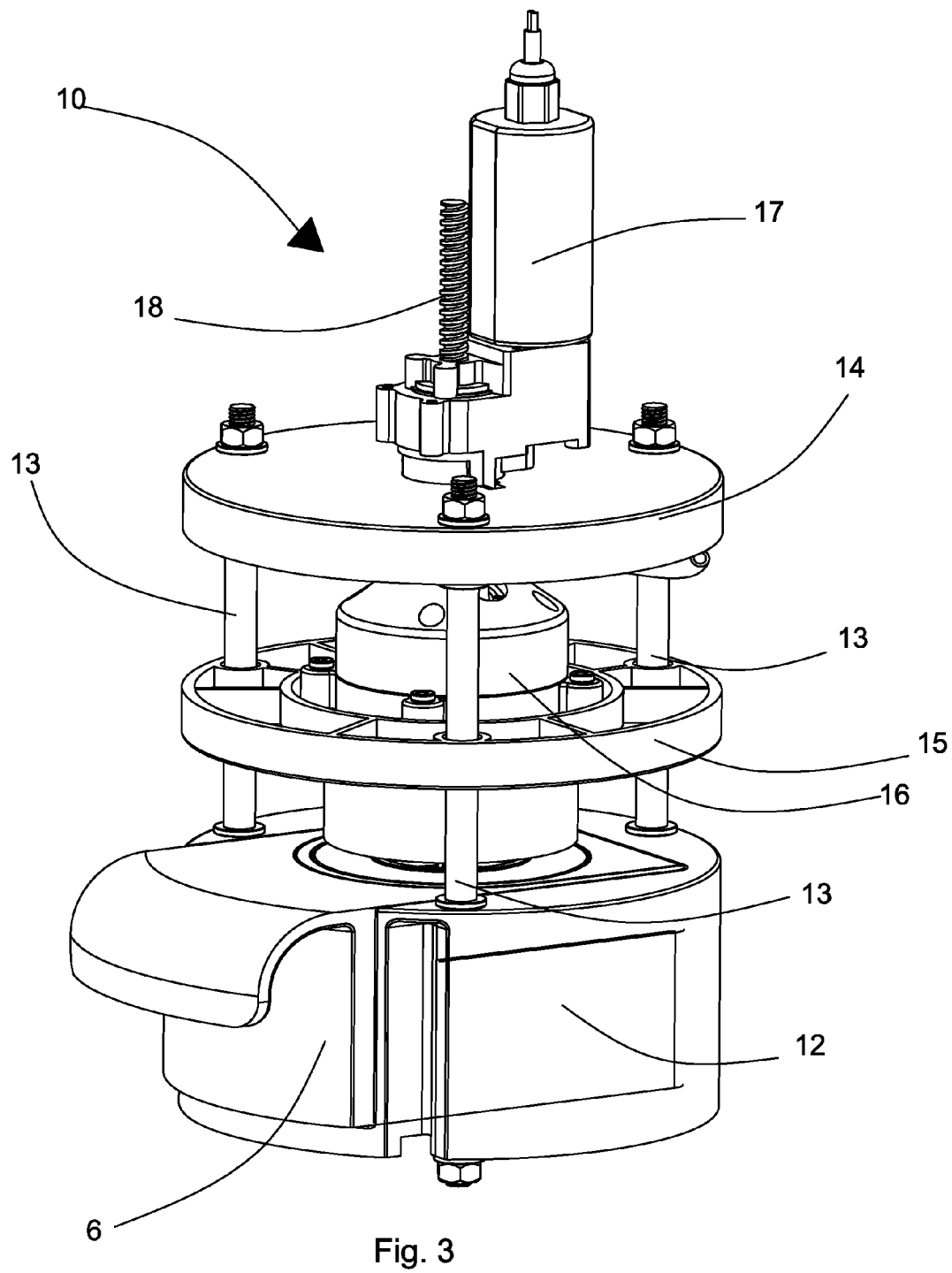
FIG. 3 is a perspective view of a beverage dispensing unit of a machine according to the invention.

With reference to FIGS. 1 and 2, a machine 1 according to the invention comprises a base 2 on which are arranged a first container 3, for example of cylindrical shape, inside which a dispensing unit 10 is arranged (FIG. 3) by means of which a beverage is prepared and dispensed.

Figure 4:
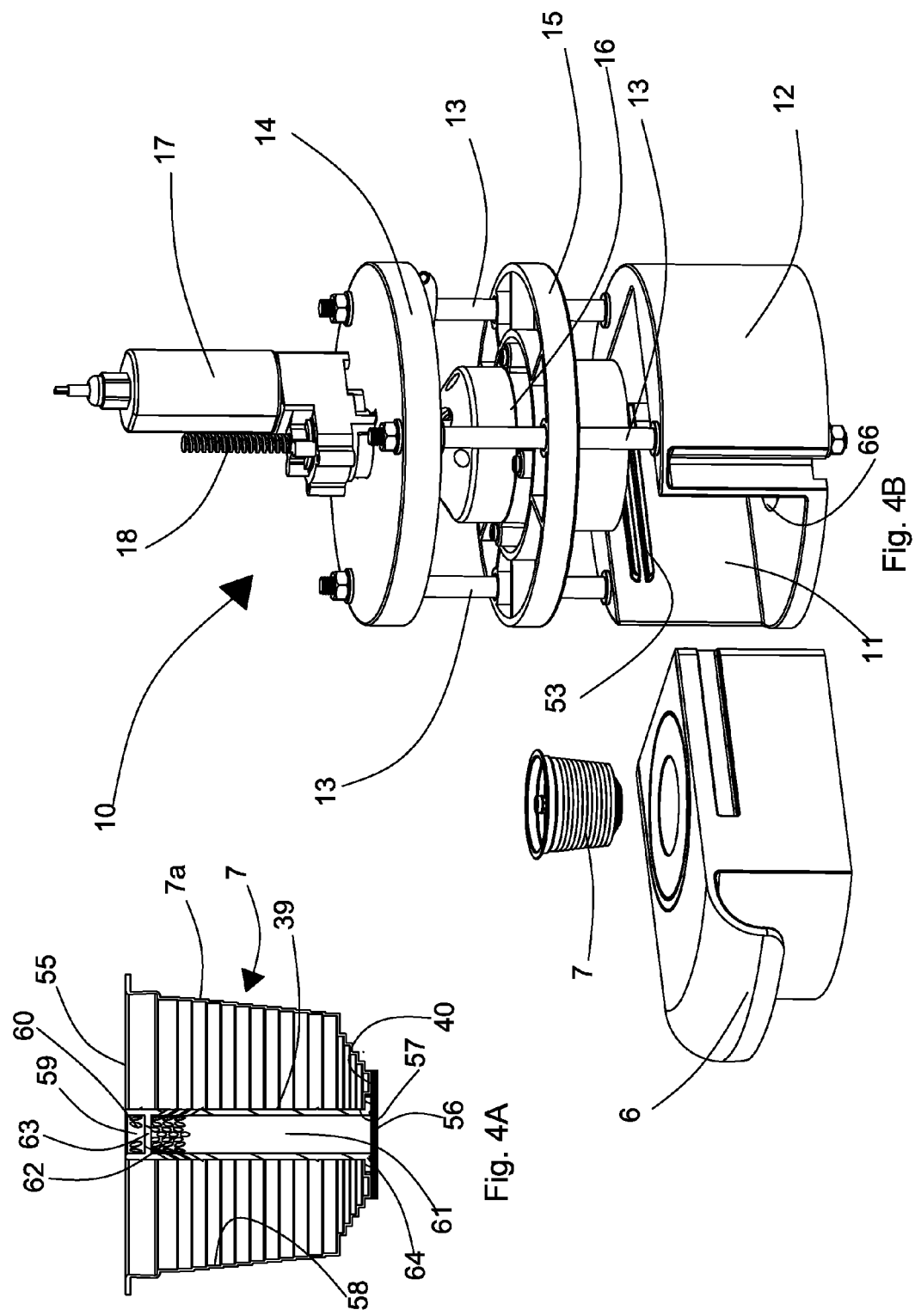
FIG. 4A is a sections view of a capsule for preparing beverages that is usable with the machine according to the invention.
FIG. 4B is a perspective view like that in FIG. 3, which illustrates inserting into the dispensing unit a capsule containing the product to make a beverage, using a box element that is insertable into a dispensing unit and is extractable therefrom.
Figure 5:
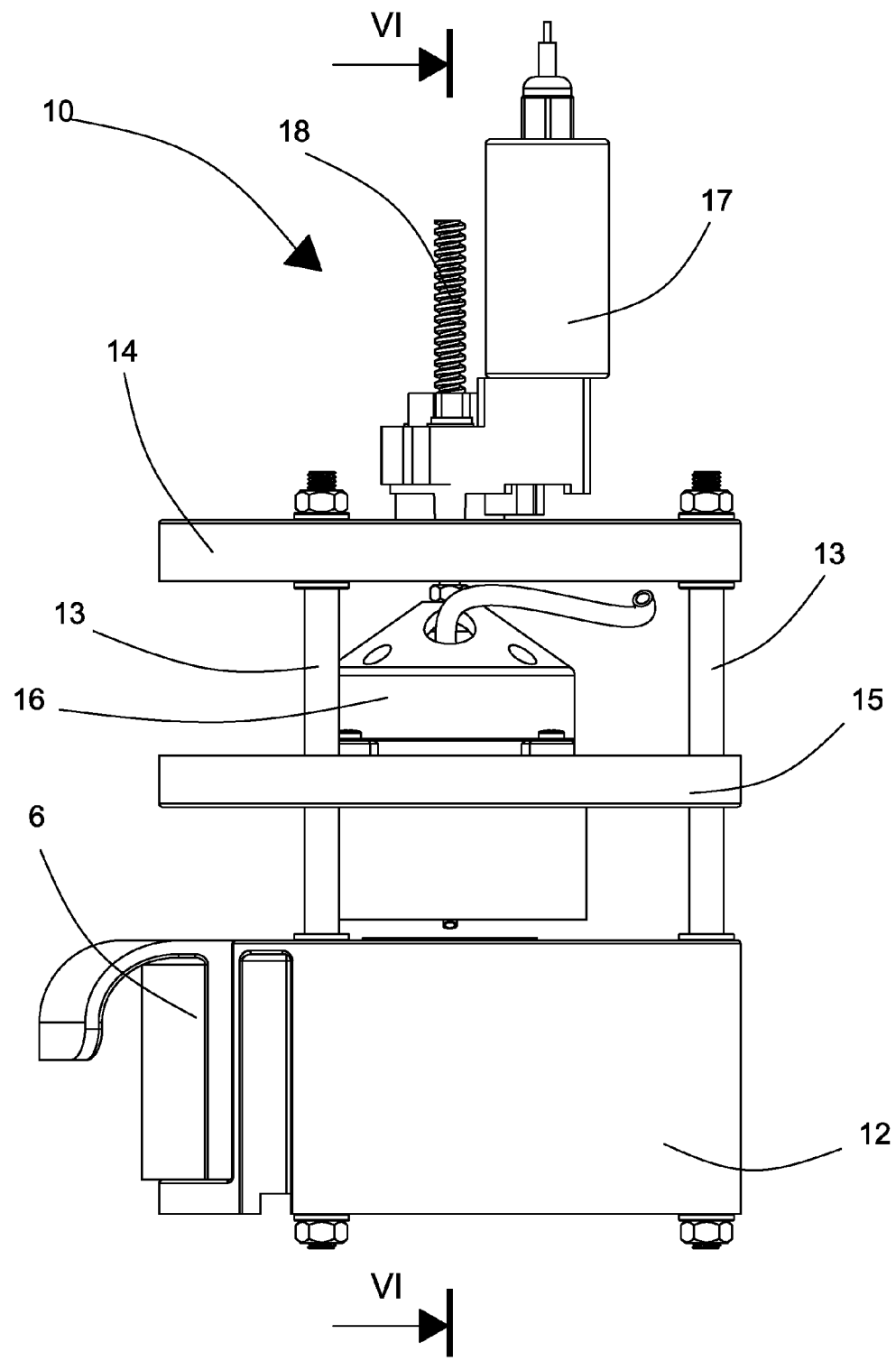
FIG. 5 is a side view of the beverage dispensing unit.

The dispensing unit 10 is provided with a space 11 intended for housing a box element 6 into which a compressible and crushable capsule 7 (FIGS. 4 and 4A) is insertable that contains a percolable, or soluble or infusion or concentrated product for preparing a beverage, such as, for example, coffee, barley, tea, chocolate, etc. The box element 6 can be inserted into the space 11, or be extracted therefrom, sliding the box element 6 on guides 53 provided in said space 11.

The container 3 is further provided with a further space 8, placed below the space 11, into which a receptacle C can be inserted, for example a glass or a cup, to receive the beverage dispensed by the dispensing unit 10.

On the bottom of the space 11 an opening 66 is made communicating with the further space 8. The opening 66 is intended to act as a passage for said beverage, to enable the beverage to be dispensed into the receptacle C.

On the sides of the first container 3 there are arranged:
a second container 4, in which a heating unit is housed that is intended for heating the water to prepare a beverage, when dispensing a hot beverage is requested;
a third container 5, in which a refrigerating unit is housed intended for cooling the water to prepare a beverage, when dispensing a cold beverage is requested.

The machine 1 according to the invention lastly comprises a tank 9 intended for containing water to prepare beverages and supply the heating unit and the refrigerating unit.

The capsule 7 (FIG. 4A), for example of the type disclosed in patent application MO2012A000326, comprises a body 7a inside which a cavity 58 is defined that contains a percolable, or soluble or infusion or concentrated product for preparing a beverage. The cavity 58 is closed above by a covering element 55 and communicates below with an opening 57, made on a bottom 40 of the capsule 7 and closed by a seal 56 that can be removed. Inside the cavity 58 an internally hollow tube 39 is arranged, the upper end of which is welded to the covering element 55 and the lower end 64 of which is sealingly inserted into the opening 57. The inside of the tube 39 is divided by a baffle 63 into an upper part 59 and into a lower part 61. The upper part 59 of the tube is provided with holes 60 near the upper end that enable a liquid delivered to the upper part 59 of the tube 39 to enter the cavity 58. The lower part 61 of the tube 39 is provided with further holes 62 near the baffle 63 that enable a liquid contained in the cavity 58 to enter said lower part 61.

A beverage is prepared by making the dispensing unit 10 interact with the capsule 7, as will be explained below.

The dispensing unit 10 comprises a respective base 12, fixed to the base 2 of the machine 1, which supports a plurality of columns 13, fixed below the base 12 and above a fixing element 14, for example a disc-shaped element.

The dispensing unit 10 further comprises an injecting unit 16 by means of which a beverage is prepared and dispensed.

The injecting unit 16 is arranged above the space 11 and is fixed to a supporting element 15 slidingly coupled on the columns 13. The injecting unit 16 is driven to move along the columns 13, together with the supporting element 15, by an actuator 17 supported by the fixing element 14.

Figure 6:
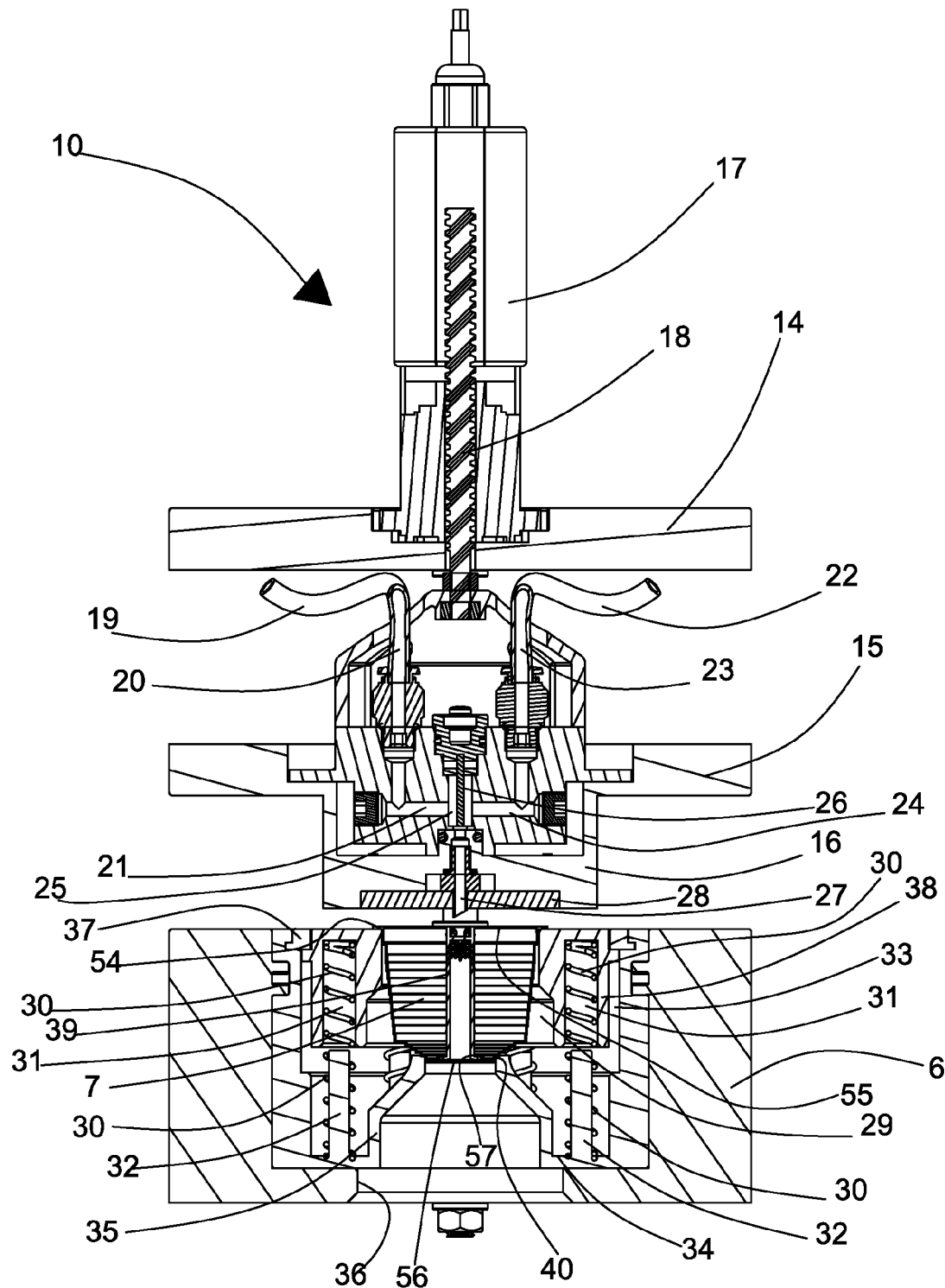
FIG. 6 is a section, made along a plane VI-VI in FIG. 5, of the beverage dispensing unit, with a capsule inserted therein, before the start of the cycle of preparing and dispensing a beverage.
Figure 7:
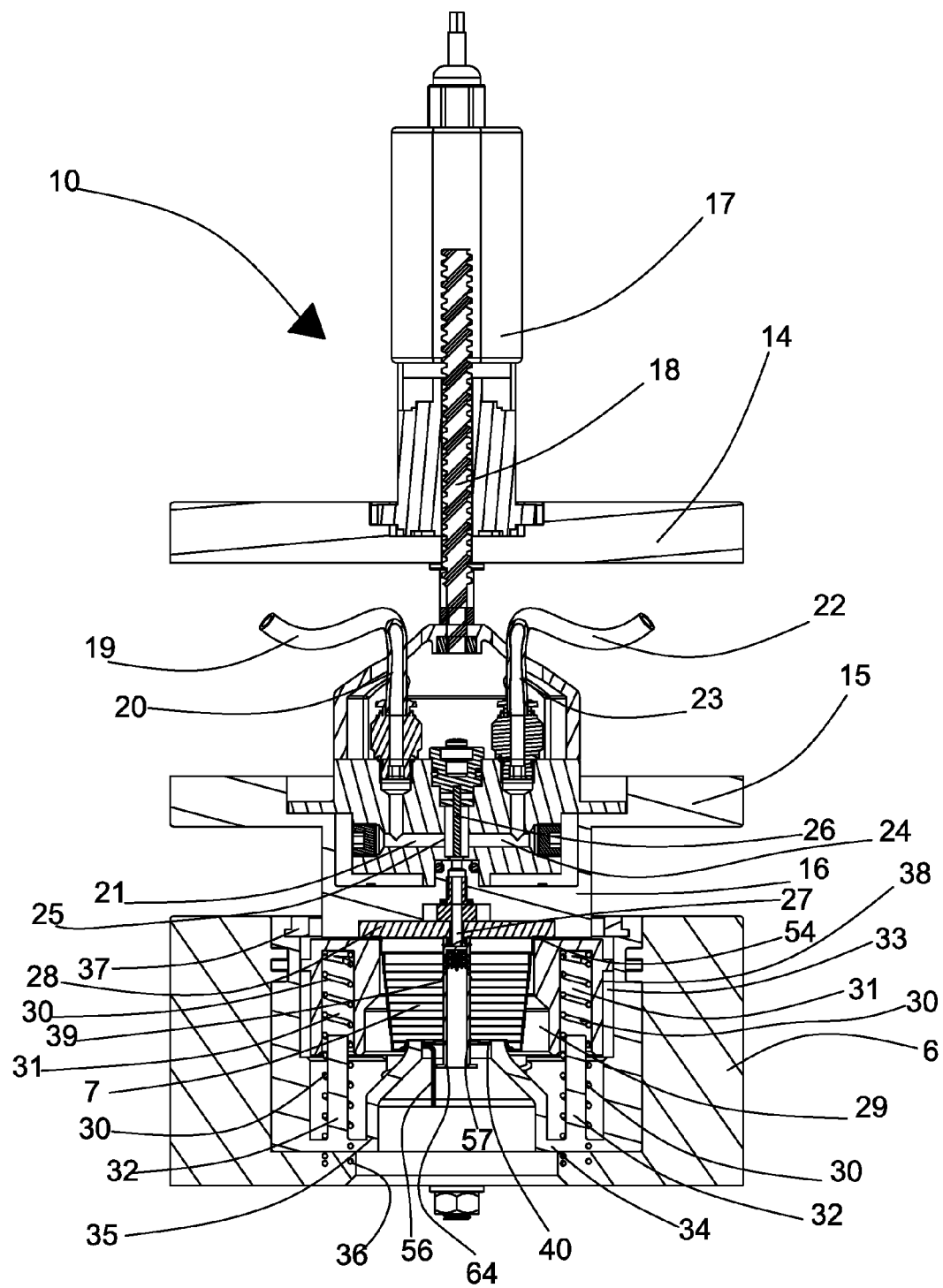
FIG. 7 is a section like that in FIG. 6, which illustrates an initial step of the cycle of preparing and dispensing a beverage.
Figure 8:
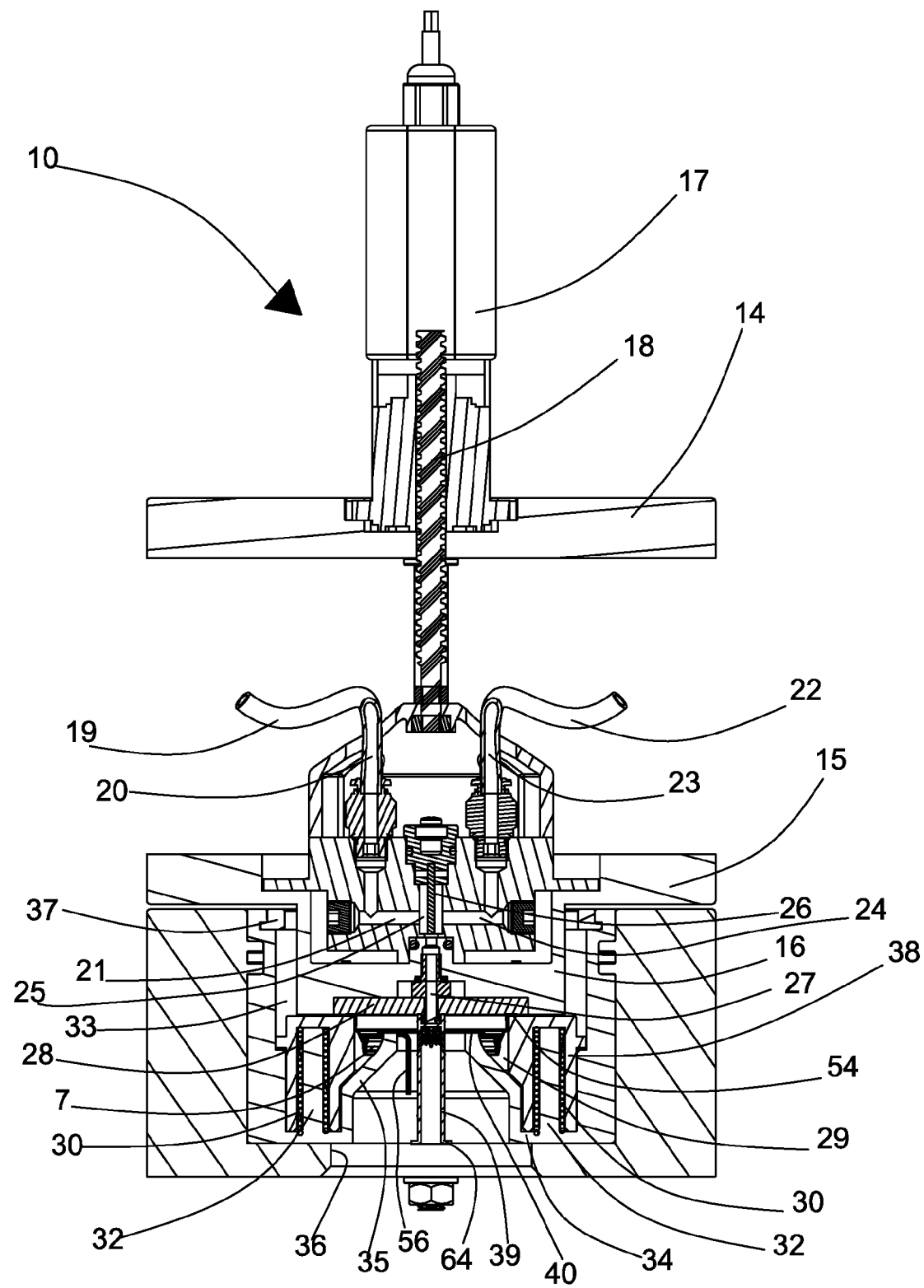
FIG. 8 is a section like that in FIGS. 6 and 7, which illustrates an intermediate step of the cycle of preparing and dispensing a beverage.
Figure 9:
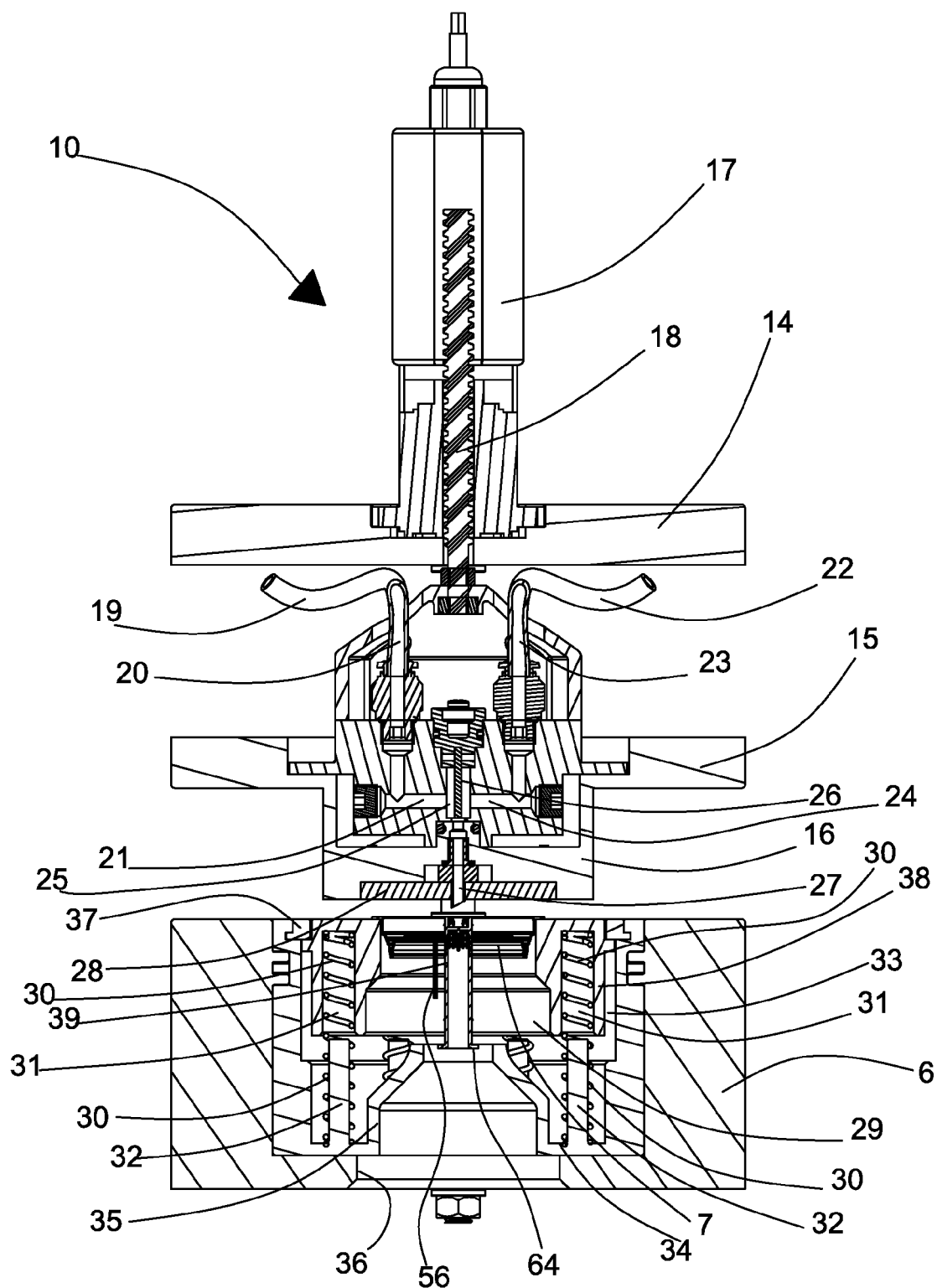
FIG. 9 is a section like that in FIGS. 6, 7 and 8, which illustrates a final step of the cycle of preparing and dispensing a beverage.
Figure 10:
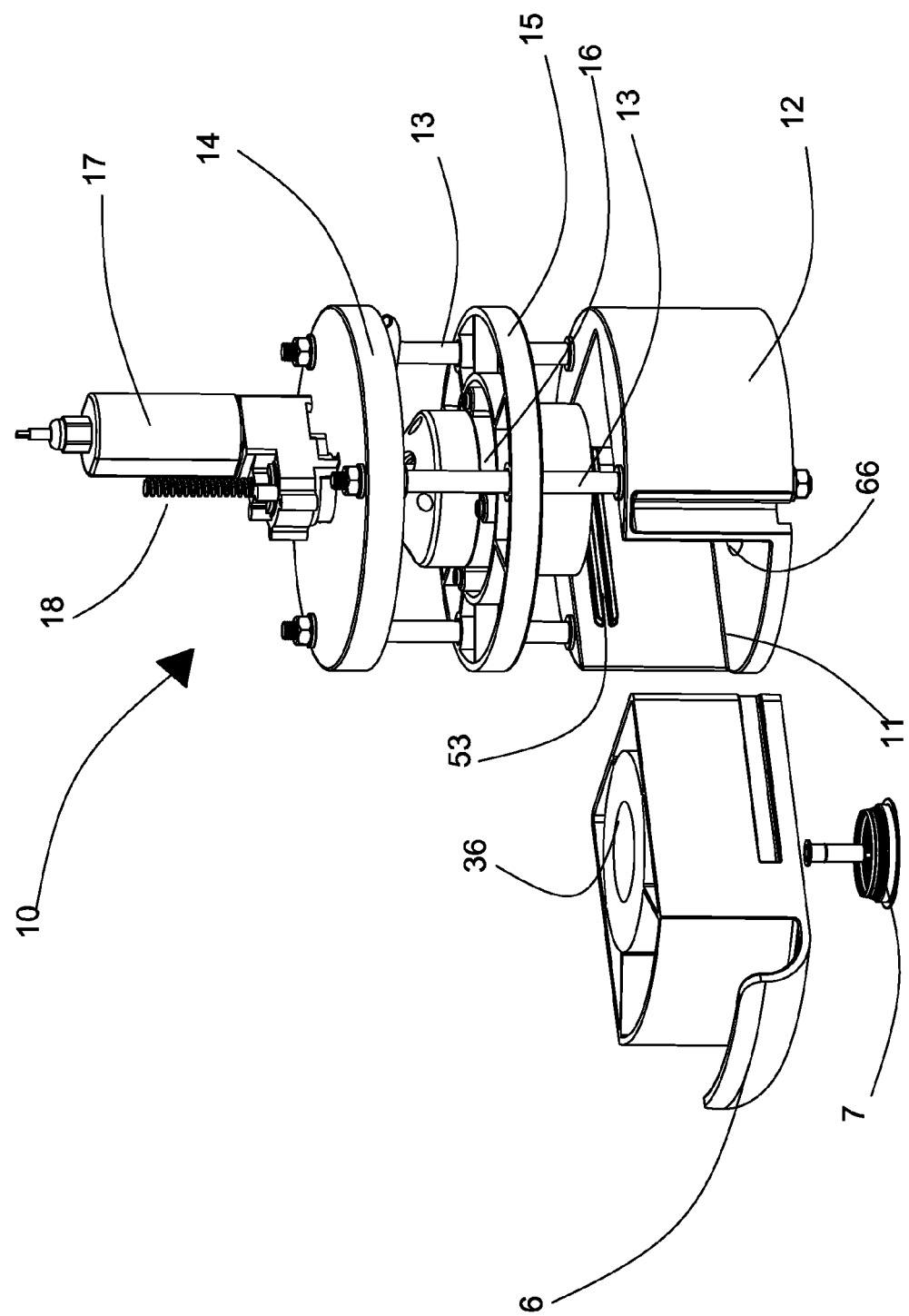
FIG. 10 is a perspective view of the beverage dispensing unit, which illustrates extracting the cap from the dispensing unit, at the end of preparing and dispensing a beverage.
Figure 11:
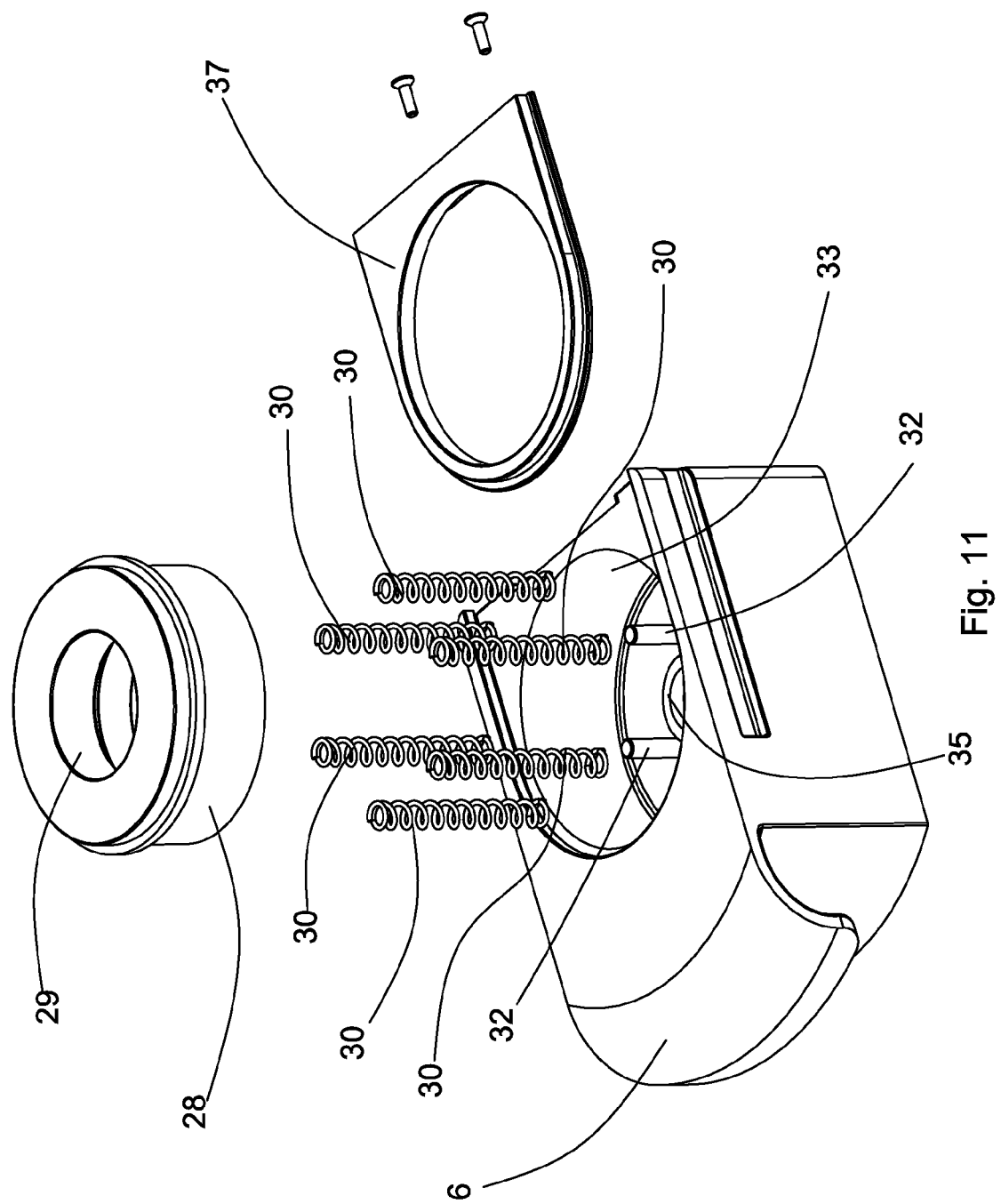
FIG. 11 is an exploded view of the box element.
Figure 12:
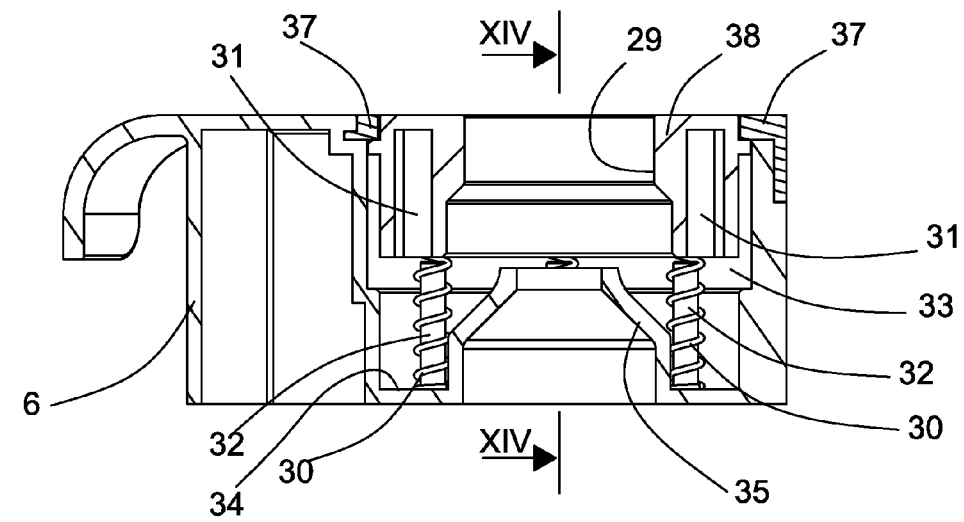
FIG. 12 is a cross-section view of the box element.
Figure 13:
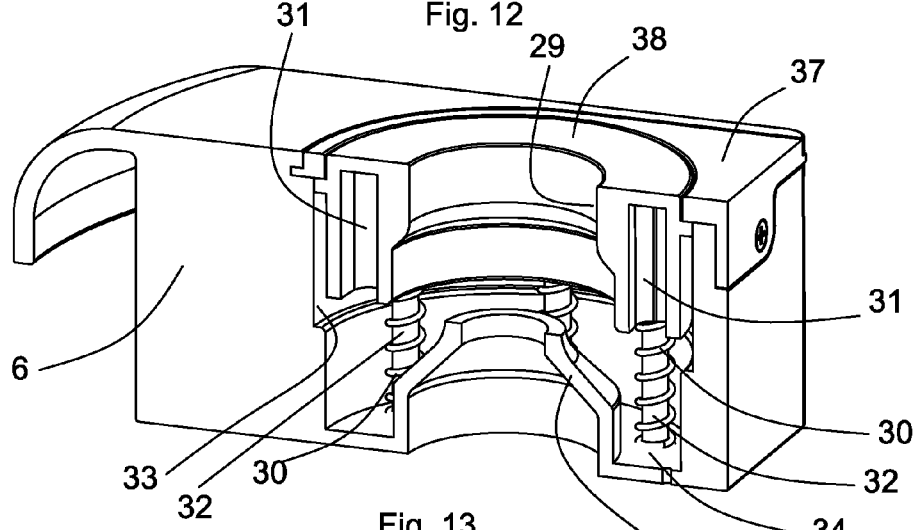
FIG. 13 is a perspective view of the section in FIG. 12.
Figures 14, 15:
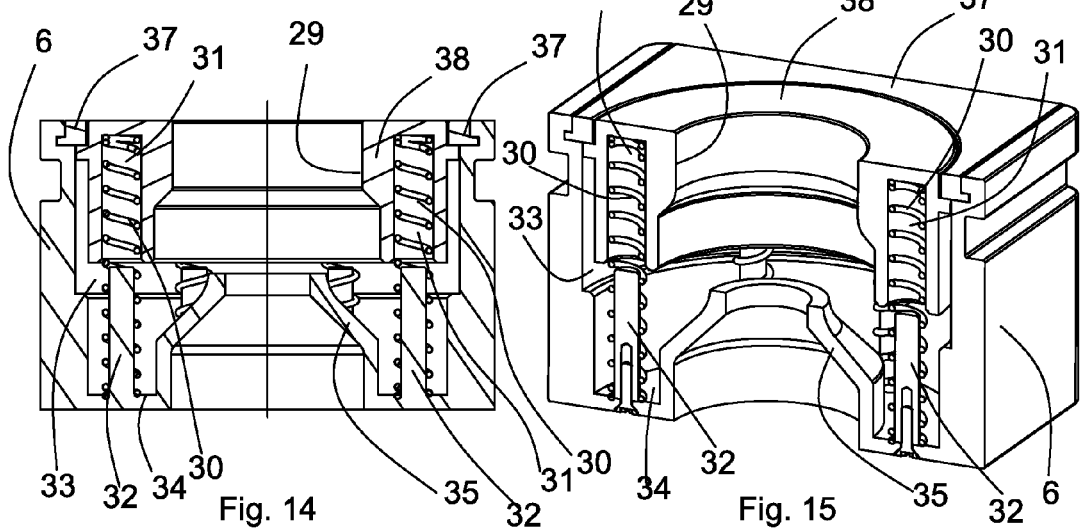
FIG. 14 is a section of the box element made along a plane XIV-XIV in FIG. 12.
FIG. 15 is a perspective view of the section in FIG. 14.

In FIG. 6 a section is illustrated of the dispensing unit 10 at the start of the cycle of preparing a beverage.

For the sake of clarity, in the section the base 12 of the dispensing unit 10 and the columns 13 on which the injecting unit 16 slides have been omitted.

As can be seen in FIG. 6, the injecting unit 16 is connected to a threaded shaft 18 that is driven by the actuator 17 to rotate and slide in a direction parallel to the columns 13, i.e. in a vertical direction, so as to move the injecting unit 16 downwards or upwards.

The injecting unit 16 is suppliable with hot water coming from the heating unit through a first supplying conduit 19, which supplies a first inlet conduit 20 and a first union conduit 21.

The injecting unit 16 is suppliable with cold water coming from the refrigerating unit through a second supplying conduit 22, which supplies a second inlet conduit 23 and a second union conduit 24.

The first union conduit 21 and the second union conduit 24 lead into a chamber 25 that supplies a nozzle 27, through which the hot or cold water is injected into the capsule 7, as will be explained in detail below. In the chamber 25 an elastic membrane 26 is arranged, the function of which is to prevent hot water delivered into the chamber 26 from being able to reflow into the cold water circuit, i.e. towards the second supplying conduit 22 and, vice versa, prevent cold water delivered to the chamber 25 from being able to reflow into the hot water circuit, i.e. towards the first supplying conduit 19.

In fact, when, for example, hot water is delivered into the chamber 25, through the first supplying conduit 19, the first inlet conduit 20 and the first union conduit 21, the pressure of the delivered hot water deforms the elastic membrane 26, pushing the elastic membrane 26 to block the second union conduit 24, preventing the hot water from being able to reflow into the cold water circuit.

On the other hand, when the cold water is delivered into the chamber 25, through the second supplying conduit 22, the second inlet conduit 23 and the second union conduit 24, the pressure of the delivered cold water deforms the elastic membrane 26, pushing the elastic membrane 26 to block the first union conduit 21, thus preventing the cold water from being able to reflow into the hot water circuit.

At the lower end of the injecting unit 16 a seal element 28 is provided, consisting, for example, of a disk made of silicone material intended for interacting with the capsule 7 and making a seal on the capsule 7, as will be disclosed in greater detail below. The nozzle 27 passes through the seal element 28.

The box element 6 is provided with a housing element 38 provided with a seat 29 into which the capsule 7 is insertable. The housing element 38 is slidable in a vertical direction inside a chamber 33, obtained inside the box element 6, and rests on a plurality of elastic elements 30, for example a plurality of coil springs, an upper part of which is guided in a respective seat 31 of the housing element 38 and a lower part of which is guided on a respective guiding pin 32 and rests on a bottom 34 of the chamber 33.

To prevent the housing element 38 being able to exit the chamber 33 under the thrust of the springs 30, a stopping element 37 is provided at the upper end of the chamber 33.

On the bottom 34 of the chamber 33 a fixed support 35 is arranged that is shaped as an upturned cup, on which the bottom 40 of the capsule 7 rests when it is inserted into the seat 29 of the housing element 38.

The fixed support 35 is internally hollow and open at both ends, upper and lower. The fixed support 35 communicates below with an opening 36 made on the bottom 34 of the chamber 33 and communicating with the exterior of the box element 6 and in particular with the opening 66 made on the bottom of the space 11, when the box element 6 is inserted into the space 11. The opening 36 is used to dispense by gravity the beverage prepared in the dispensing unit 10 into the container C.

Figure 16:
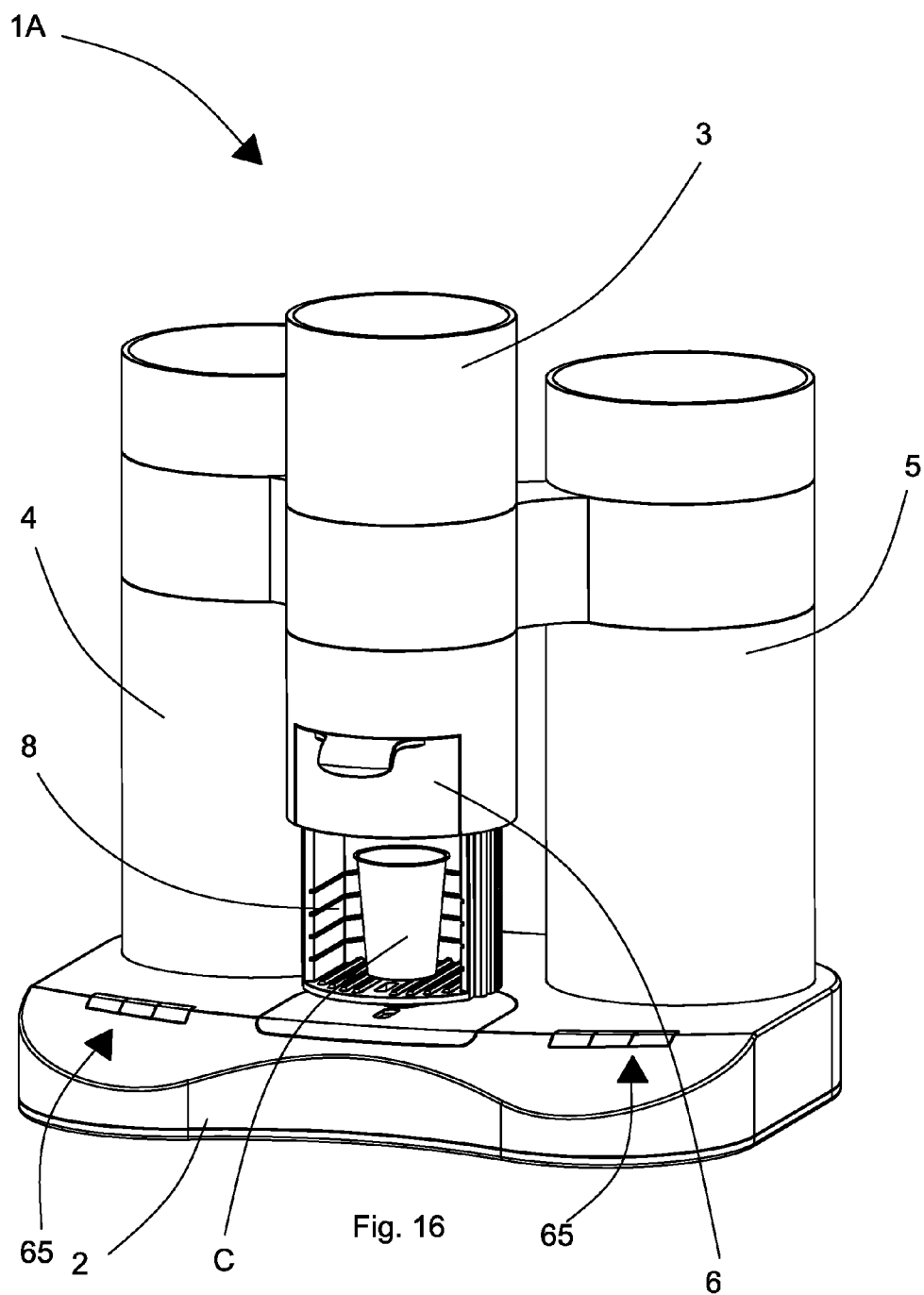
FIG. 16 is a perspective front view of a second embodiment of a machine according to the invention.
Figure 17:
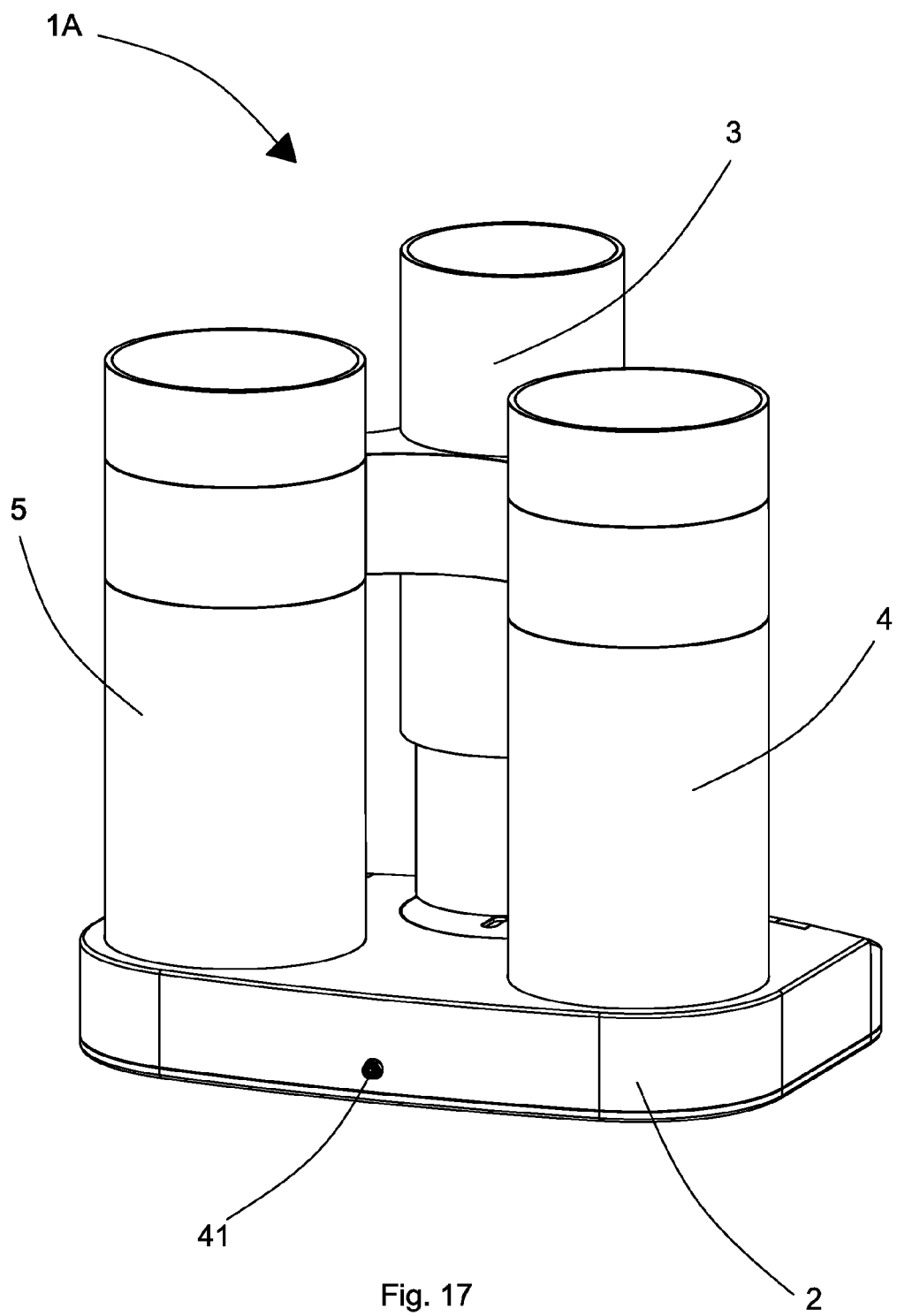
FIG. 17 is a perspective rear view of the machine in FIG. 16.

In FIGS. 16 and 17 a second embodiment of a machine 1A according to the invention is illustrated.

The machine 1A differs from the machine 1 illustrated in FIGS. 1 to 15 by the fact that it is not provided with a water tank. The water is supplied to the machine 1A by a connecting element 41 that enables the machine 1A to be connected to a water supply.

Figure 18:
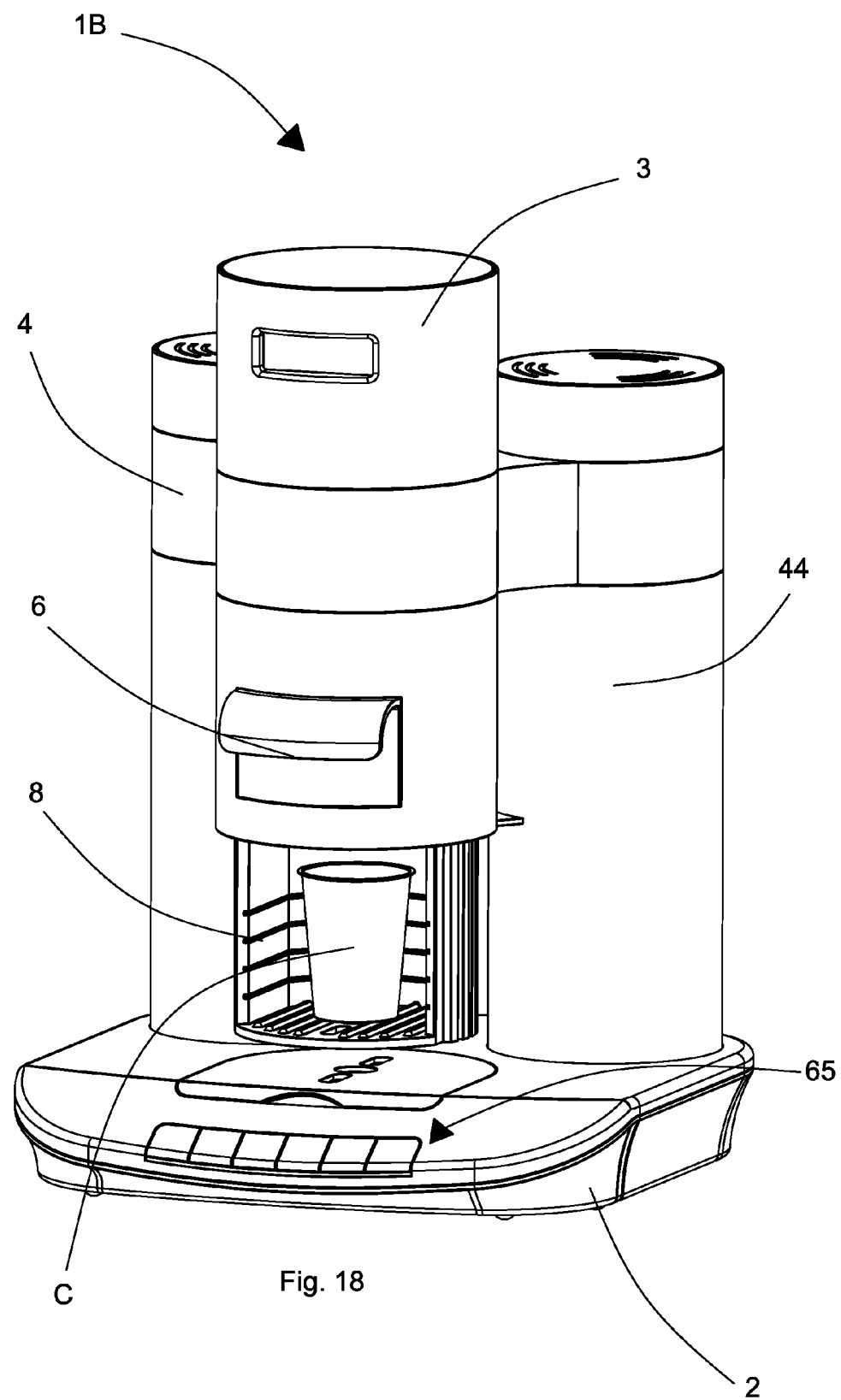
FIG. 18 is a perspective front view of a third embodiment of a machine according to the invention.
Figure 19:
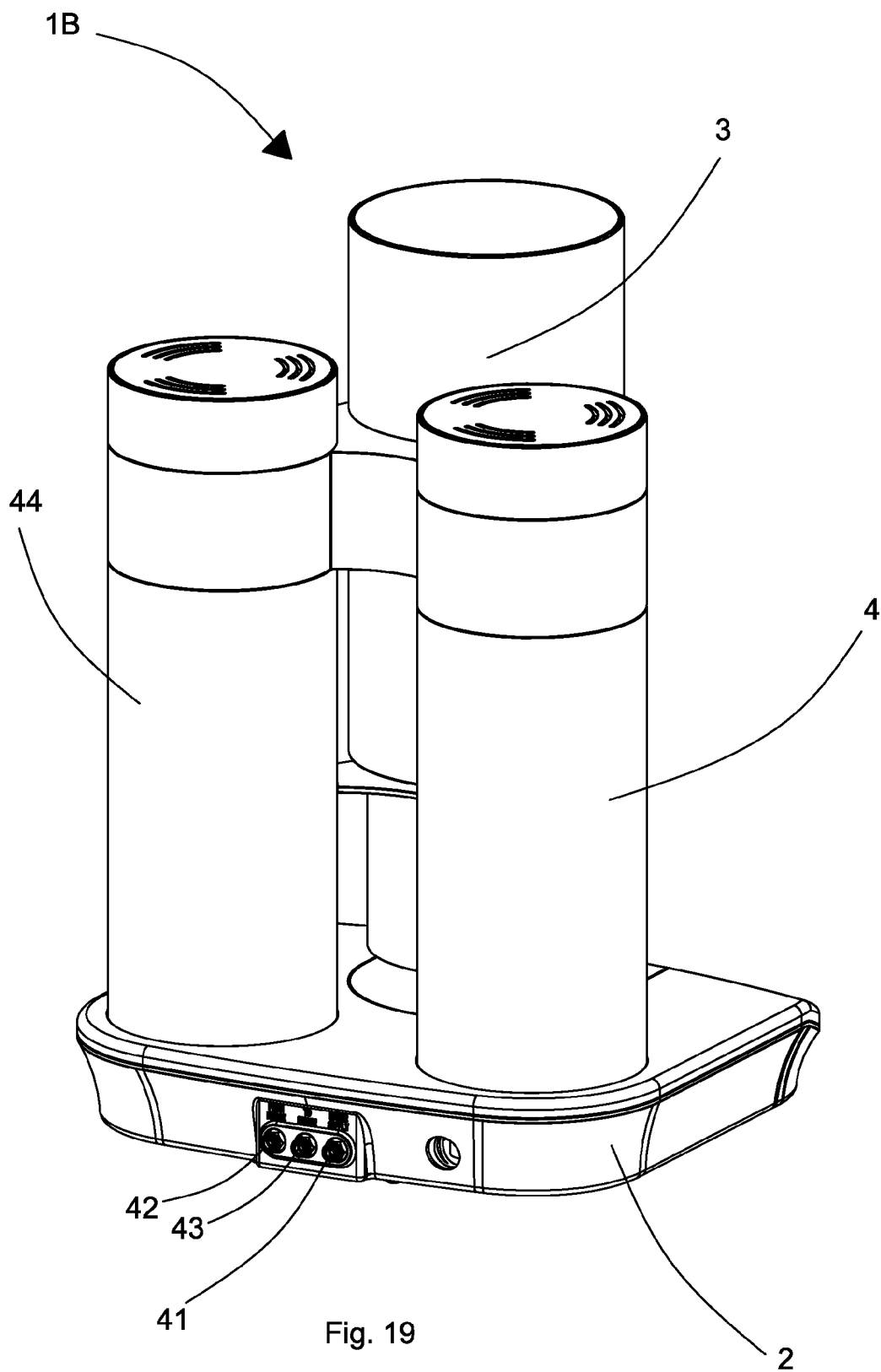
FIG. 19 is a perspective rear view of the machine in FIG. 18.

In FIGS. 18 and 19 a third embodiment of a machine 1B according to the invention is illustrated.

The machine 1B comprises a base 2 on which a first container 3 is arranged inside which the dispensing unit 10 is arranged by means of which a beverage is prepared and dispensed.

On the sides of the first container 3 there are arranged:
the second container 4, in which the heating unit is housed that is intended for heating the water for preparing a beverage, when dispensing a hot beverage is requested;
a third container 44, which can act as a water tank for supplying the heating unit.

The machine 1B is further provided with the connecting element 41, which enables the machine 1B to be connected to an external water supply to supply the machine 1B with water from said water supply rather than from the tank 44. The machine 1B is further provided with union elements comprising a first union 42 and a second union 43, which enables the machine to be connected to an external refrigerating unit intended for cooling the water to prepare a beverage, when dispensing a cold beverage is requested.

Using an external refrigerating unit is particularly suitable when the machine 1B is intended for high hourly dispensing of cold beverages, which thus requires a refrigerating unit of relatively large dimensions, which would excessively increase the overall dimensions of a machine 1B, if it were built therein.

Figure 21:
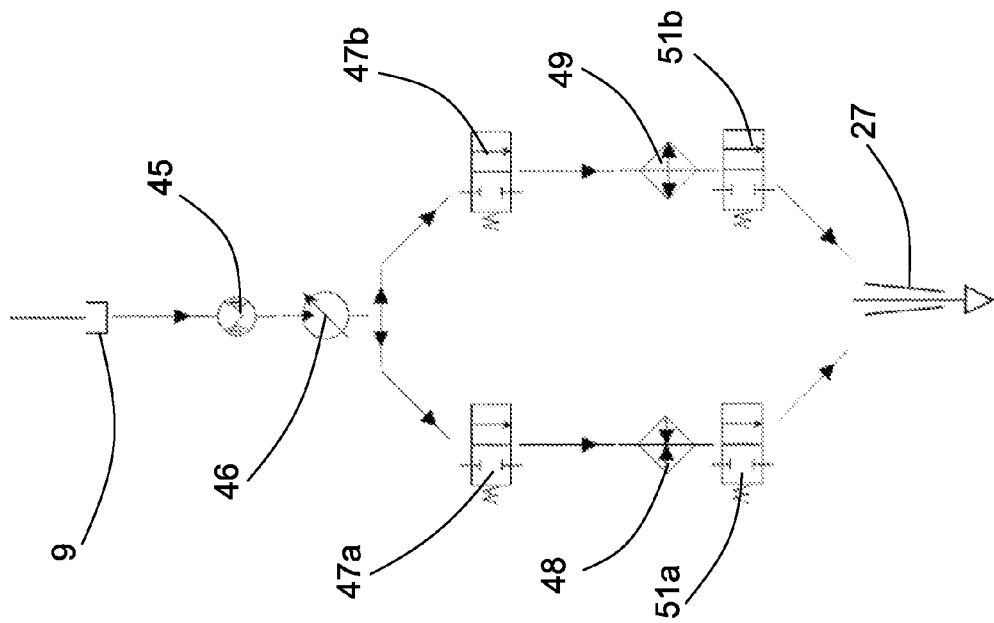
FIG. 21 is a hydraulic diagram of the machine according to the invention.
Figure 20:
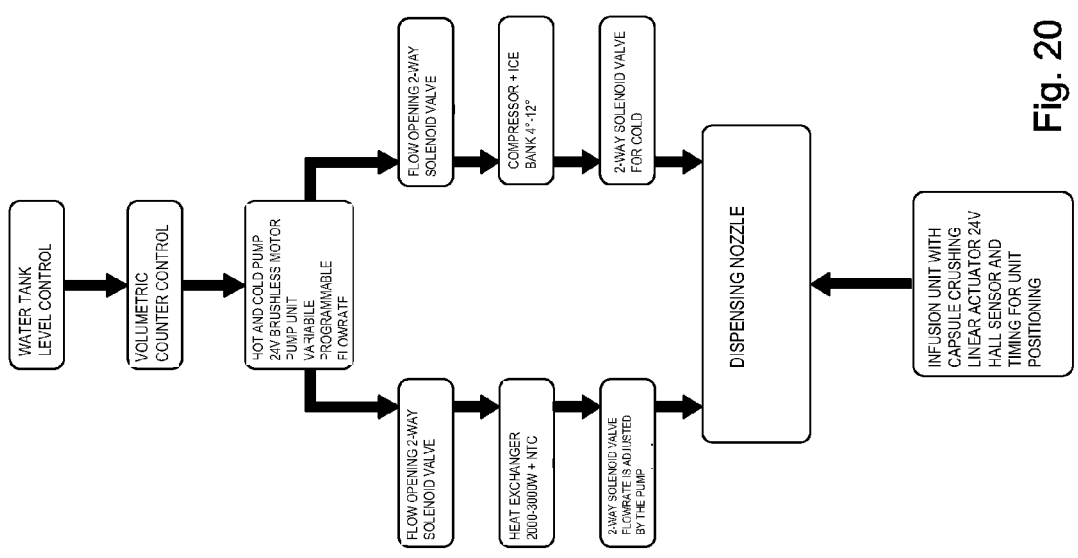
FIG. 20 is a block diagram of the machine according to the invention.

In FIGS. 20 and 21 the operation is illustrated of the machine 1, 1A, 1B, according to the invention, from the hydraulic point of view, via a block diagram (FIG. 20) and a hydraulic diagram (FIG. 21) of a machine.

The hydraulic circuit of the machine 1, 1A, 1B comprises a pump 46 with a variable flowrate, which removes water from the tank 9, or 44, or from an external water supply through the connecting element 41.

The quantity of water removed from the tank 9, or 44, or from the external water supply, is measured by a volumetric counter 45.

Downstream of the pump 46 a first two-way valve 47*a* and a second two-way valve 47*b* are arranged. Via the first two-way valve 47*a*, the water can be sent to the heating unit 48 and from the latter to the nozzle 27 via a third two-way valve 51*a*. Via the second two-way valve 47*b*, the water can be delivered to the refrigerating unit 49 and from the latter to the nozzle 27 through a fourth two-way valve 51*b*.

The machine 1 further comprises a control system (not shown) connected to the actuator 17, to the pump 46, to the volumetric counter 45 and to the two-way valves 47*a* and 47*b*, 51*a* and 51*b*, to modify operating parameters of the actuator 17 and/or of the pump 46 and to command the opening and/or closing of the aforesaid valves according to the type of beverage that the machine 1, 1A, 1B has to dispense. For example, the movement speed of the injecting unit 16, the pressure of the pump P, the quantity of liquid with which to prepare the beverage and the temperature thereof for preparing a hot or cold beverage with or without foam starting from the same capsule are adjustable.

Figure 22:
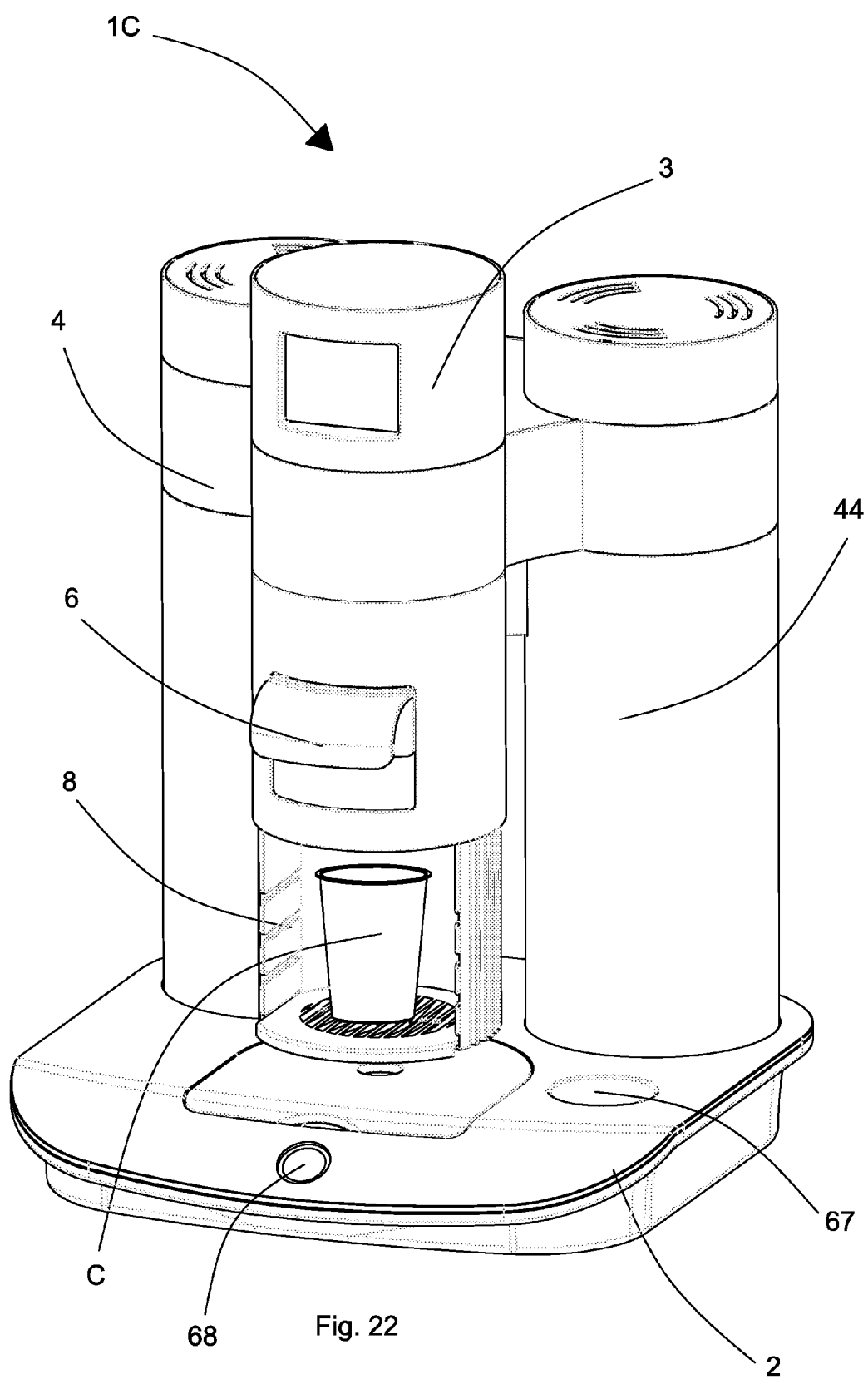
FIG. 22 is a perspective front view of a version of the machine according to the invention.

In FIG. 22, a further machine 10 according to the invention is illustrated that is a version of the previously disclosed machines 1, 1A and 1B.

The machine 10 is provided with an optical device 67 for reading optical codes, such as, for example, barcodes or QR codes, which are possibly impressed on the capsules 7.

The optical device 67 is operationally connected to the control system of the machine that, on the basis of the information contained in the barcode, or in the QR code, read by the optical device 67 on the capsule 7, automatically sets the operating parameters of the machine to obtain the beverage corresponding to the product contained in the capsule 7.

The machine 10 is further provided with a start/stop key or button 68 by means of which a user can start the machine 10 after reading the optical code impressed on the capsule 7 by the optical reader 67. The machine will dispense the desired beverage using the dispensing programme selected on the basis of the information contained in the optical code.

Figure 24:
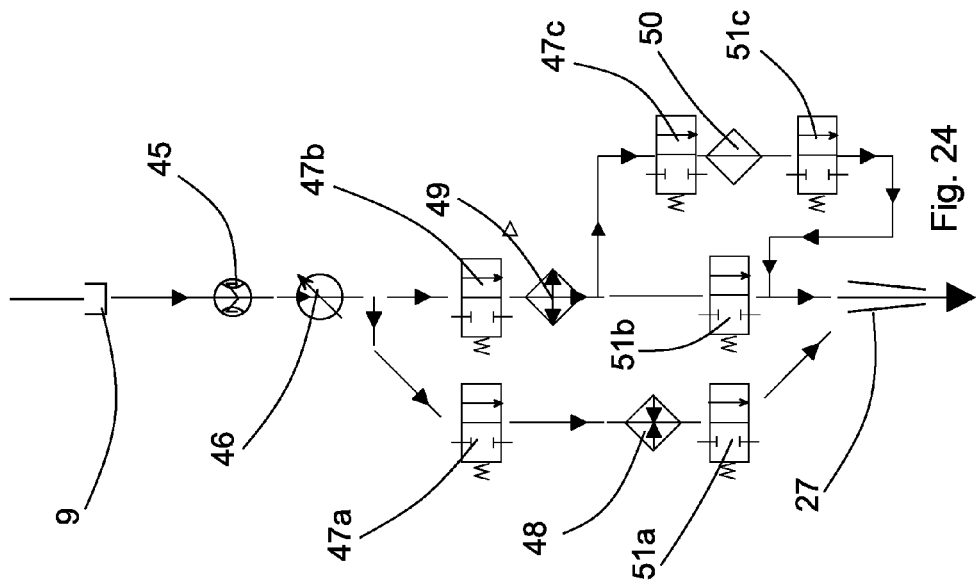
FIG. 24 is a hydraulic diagram of a further version of the machine according to the invention.
Figure 23:
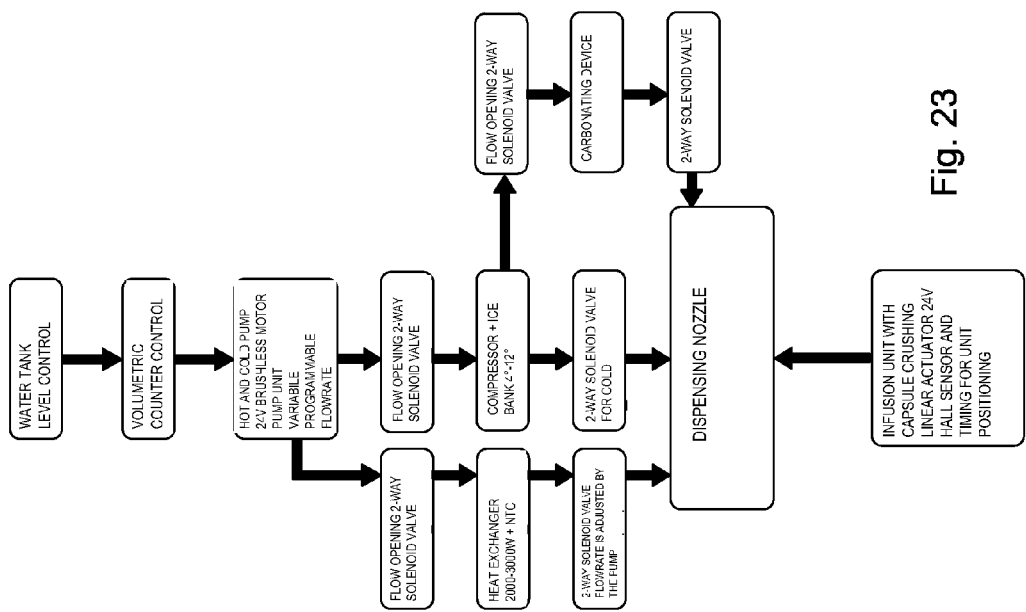
FIG. 23 is a block diagram of a further version of the machine according to the invention.

In FIGS. 23 and 24 the operation is illustrated of a further version of the machine according to the invention, from the hydraulic point of view, through a block diagram (FIG. 23) and a hydraulic diagram (FIG. 24) of a machine.

In this version a carbonating device 50 is provided, associated with the refrigerating unit 49, by means of which a gas can be delivered, for example carbon dioxide, to the water, in order to obtain a carbonated beverage.

The gassing device is connected as a branch to the outlet of the refrigerating unit 49 and can be supplied via a fifth two-way valve 47*c* with refrigerated water coming from the refrigerating unit 49. The refrigerated water to which the gas in the carbonating device 50 has been added can be delivered to the nozzle 27 via a sixth two-way valve 51*c*.

The operation of a machine according to the invention in the different illustrated embodiments is disclosed below.

When a beverage has to be prepared, the box element 6 is extracted from the space 11 and a capsule 7 containing the food product for preparing the beverage is inserted into the seat 29 of the housing element 38. The capsule 7, after being inserted into the seat 29, rests with its bottom 40 on the fixed support 35 and, with its upper edge 54 on the housing element 38.

After the capsule is inserted into the box element 6, the latter is inserted into the space 11, thus positioning the capsule 7 below the injecting unit 16 and the preparation programme for the beverage that it is desired to obtain is selected and started up by keys or buttons 65 provided, for example, on the base 2 of the machine 1, 1A, 1B.

The control system automatically sets in the machine 1 the operating parameters corresponding to the desired beverage.

If the machine is provided with the optical device 67 and on the capsule 7 an optical code is impressed containing the information relating to the mode of preparing the beverage to be obtained, before the capsule 7 is inserted into the seat 29, the optical code impressed on the capsule 7 is read with the optical reader 67, so that the control system can automatically set the operating parameters for preparing the beverage on the basis of the information contained in said optical code.

After reading the optical code the user starts the programme for dispensing the beverage by means of the start/stop button 68.

It should be noted that the machine according to the invention can be provided with both keys and buttons 65 for the manual selection of the programme for preparing the beverage, and with the start/stop key 68 associated with the optical device 67.

In an initial step of the cycle of preparing and dispensing the beverage, the actuator 17 is started that makes the dispensing unit 10 descend until the disk 28 comes to rest on the housing element 38 and on the upper part of the capsule 7, sealingly coupling therewith. Simultaneously, the nozzle 27 pierces the covering element 55 of the capsule 7 and is inserted into the upper part 59 of the tube 39.

The actuator 17 moves still further downwards for a short portion, for example 7 mm, the injecting unit 16 that pushes down the housing element 38. In this manner, the capsule 7 is crushed slightly, because the bottom 40 thereof cannot move, because it rests on the fixed support 35, whereas the upper edge of the capsule, which rests on the housing element 38, can be pushed downwards by the dispensing unit 10 together with the housing element 38.

Crushing the capsule 7 makes the lower end of the tube 39 exit the lower opening 57, detaching a portion of the seal 56 and thus opening the capsule 7.

The pump 45 is then started and the first two-way valve 47a and the third two-way valve 51a are opened to deliver into the capsule 7, through the nozzle 27, a preset quantity of hot water heated in the heating unit 48. Said preset quantity and the temperature at which the water is heated depend on the type of product contained in the capsule 7 and on the beverage that it is desired to prepare. Alternatively, the second two-way valve 47b and the fourth two-way valve 51b are opened to deliver into the capsule 7, through the nozzle 27, a preset quantity of cold water, refrigerated in the refrigerating unit 49.

Also in this case, the preset quantity of water to be delivered to the capsule 7 depends on the type of product contained therein and on the beverage that it is wished to prepare.

If it is desired to prepare a carbonated beverage, the second two-way valve 47b, the fifth two-way valve 47c and the sixth two-way valve 51c are opened, keeping the fourth two-way valve 51b closed. In this manner, the refrigerated water exiting the refrigerating unit 49 is delivered to the carbonating device 50, is carbonated and is sent to the nozzle 27.

The quantity of water, hot or cold, to be delivered to the capsule 7 is measured with the volumetric counter and the control system commands the pump to start up when the preset quantity of hot and cold water has been delivered to the capsule 7.

The hot and cold water dispensed by the nozzle 27 enters the upper part 59 of the tube 39 and, passing through the holes 60, enters the cavity 58 of the capsule 7.

After the preset quantity of hot or cold water has been delivered to the capsule 7, an interval of time can be provided during which water is not dispensed to make an infusion of the product contained in the capsule, or to enable a soluble product contained in the capsule to dissolve in the water.

Subsequently, in an intermediate step of the cycle of preparing and dispensing the beverage, the pump 45 is restarted and a further preset quantity of hot or cold water is delivered to the capsule, which is measured by the counter 45. Also this further preset quantity of hot or cold water depends on the type of product contained in the capsule 7 and on the beverage that it is desired to prepare. Simultaneously, the actuator 17 is restarted that moves the injecting unit 16 further down and crushes the capsule 7 further and progressively by means of the disk 28, pushing downwards the housing element 38 until the capsule 7 is completely crushed, when the housing element 38 comes into contact with the bottom 34 of the chamber 33. During crushing of the capsule 7, the liquid contained therein moves from the cavity 58 to the lower part 61 of the tube 39 through the further holes 62 and is dispensed, through the opening 36 made on the bottom of the box element 6, into the receptacle C, located in the second space 8 of the dispensing unit 10.

The further quantity of hot or cold water is dispensed during the entire step of crushing the capsule 7 and continues for a certain time also at the end of crushing to wash the nozzle 27 and terminate dispensing of the beverage. In this manner the nozzle and the hydraulic circuit of the machine are protected from contamination caused by product rising up again towards the nozzle 27 caused by the counterpressure or by crushing.

During dispensing of the further preset quantity of hot or cold water and crushing of the capsule 7, the coupling seal between the disk 28 and the upper part of the capsule 7 ensures that the liquid delivered to the capsule 7 is not able to exit the upper part thereof.

At the end of dispensing the further quantity of hot or cold water, in a final step of the cycle of preparing and dispensing the beverage, the actuator 17 moves the injecting unit 16 upwards, which causes an upward movement of the housing element 38 under the thrust of the springs 30, until the housing element 38 returns to the start position.

When also the injecting unit 16 has returned to the initial position (see FIG. 9) in which the disk 28 is no longer in contact with the capsule 7 and the housing element 38, the box element 6 can be extracted from the space 11 of the dispensing unit 10 and be overturned to extract the capsule 7.

The volume of the receptacle C intended for receiving the beverage can vary from about 50 ml to about 250 ml, depending on the type of beverage to be prepared.

Similarly, also the flowrate of the pump 46, the time for dispensing the hot or cold water and the crushing speed of the capsule 7 can vary according to the beverage to be prepared, as specified here below.

In order to obtain products without foam or cream, such as, for example long coffees, cold tea, liquid concentrate beverages, beverages from soluble powder with hot or cold water, a preset quantity of hot or cold water is slowly delivered at low pressure to the capsule 7, over a period varying from between about 14 s and about 80 s. The beverage is dispensed by slowly crushing the capsule 7, with a crushing stroke of about 25 mm over a period comprised between about 1.6 s and about 5 s, in particular between about 1.8 s and about 5 s.

If, for example, tea has to be prepared by making an infusion of tea leaves, hot water is injected into the capsule at a temperature comprised between 50° C. and 98° C., in a sufficient quantity to cover the tea leaves, remaining always below the level of the further holes 62 of the lower part 61 of the tube 39. The tea is thus left in an infusion, without injecting further water, for a time that varies between 1 s and 4 min and then a further quantity of water is dispensed, depending on the quantity of tea to be prepared, whereas the capsule 7 is crushed slowly, as indicated above. Water dispensing continues for at least 1 s after crushing of the capsule 7 has terminated, to clean the nozzle 27, as specified previously.

If a beverage such as, for example, pomegranate juice, has to be prepared from liquid concentrate, 99% of the water necessary for preparing the beverage is delivered slowly to the capsule 7 and the beverage is then dispensed by crushing the capsule slowly, as previously.

In order obtain products with foam or cream such as, for example, mocaccino, iced coffee or hot coffee with foam, hazelnut cream, or chocolate, or beverages made from powder with hot or cold water, a preset quantity of hot or cold water is delivered to the capsule 7, over a period varying from between 0.4 s and 13 s and the beverage is dispensed with rapid crushing of the capsule 7, with a crushing stroke of about 25 mm over a time comprised between about 0.5 s and about 1.2 s, in particular between about 1.2 s and about 1.6 s.

For example, for preparing mocaccino, 80% of the water necessary for preparing the beverage is delivered rapidly to the capsule 7 and then the beverage is delivered by crushing the capsule 7 rapidly, as specified above whilst the remaining 20% of water is delivered that is necessary for preparing the beverage.

The invention claimed is:

1. A beverage dispensing machine for producing a beverage from a compressible and crushable capsule containing a product, comprising
    an injecting arrangement arranged for piercing a covering element of said capsule and injecting into the latter a liquid interacting with said product to make a beverage,
    a housing element provided with a seat into which said capsule is insertable,
    a dispensing unit for dispensing said liquid into said capsule,
    said housing element resting on elastic elements, said housing element being slidable inside a chamber, obtained in a box element that is insertable into a space of said dispensing unit, said chamber being provided with a fixed support intended for constituting a rest for a bottom of the capsule when the latter is inserted into said seat,
    wherein said dispensing unit comprises an injecting unit for injecting said liquid into said capsule, said injecting unit being drivable to move in a vertical direction, to interact with said capsule, said injecting unit comprising said injecting arrangement, and wherein said injecting unit is fixed to a supporting element slidingly coupled with a plurality of columns fixed at the bottom to a base of the dispensing unit and above to a fixing element.

2. The beverage dispensing machine according to claim 1, wherein said fixed support is internally hollow and open at both ends, upper and lower, said fixed support communicating below with an opening made on the bottom of the chamber and communicating with the exterior of the box element.

3. The beverage dispensing machine according to claim 1, wherein said elastic elements are coil springs an upper part of which is guided in a seat of the housing element and a lower part of which is guided on a respective guiding pin and rests on a bottom of said chamber.

4. The beverage dispensing machine according to claim 1, wherein said box element is provided with a stopping element to prevent the housing element being able to exit the chamber under the thrust of the elastic elements.

5. The beverage dispensing machine according to claim 1, wherein said injecting unit is arranged above said space.

6. The beverage dispensing machine according to claim 1, wherein said injecting unit comprises a seal element intended for interacting with said capsule, to exert pressure thereupon and make a coupling seal with said capsule, and with said housing element to push the housing element downwards.

7. The beverage dispensing machine according to claim 6, wherein said injecting arrangement comprises a nozzle that passes through said seal element.

8. The beverage dispensing machine according to claim 1, wherein said injecting unit is slid in said vertical direction by an actuator.

9. The beverage dispensing machine according claim 1, wherein said injecting unit is supplied with said liquid through a first supplying conduit, connected to a heating unit of said liquid, and through a second supplying conduit connected to a refrigerating unit of said liquid.

10. The beverage dispensing machine according to claim 9, wherein said first supplying conduit and said second supplying conduit communicate with a chamber that supplies said injecting arrangement.

11. The beverage dispensing machine according to claim 10, wherein in said chamber an elastic membrane is arranged to prevent liquid delivered to the chamber through the first supplying conduit from being able to reflow into the second supplying conduit and liquid delivered into the chamber through the second supplying conduit from being able to reflow into the first supplying conduit.

12. The beverage dispensing machine according to claim 9, comprising a first container in which said dispensing unit is housed, a second container in which said heating unit is housed, a third container in which said refrigerating unit is housed.

13. The beverage dispensing machine according to claim 12, further comprising a tank for said liquid.

14. The beverage dispensing machine according to claim 12, further comprising a connecting element to connect the machine to a water supply.

15. The beverage dispensing machine according to claim 9, comprising a first container in which said dispensing unit is housed, a second container in which said heating unit is housed, a tank for said liquid, union elements to connect the machine to an external refrigerating unit.

16. The beverage dispensing machine according to claim 15, further comprising a connecting element for connecting the machine to a water supply.

17. The beverage dispensing machine according to claim 9, wherein said refrigerating unit is associated with a carbonating device suitable for delivering a gas to said refrigerated liquid in said refrigerating unit.

18. The beverage dispensing machine according to claim 1, wherein it further comprises an optical device suitable for reading optical codes, in particular bar codes or QR codes.

* * * * *